Dec. 31, 1935.　　F. E. FLADER ET AL　　2,025,735
AMPHIBIAN LANDING GEAR
Filed June 15, 1934　　9 Sheets-Sheet 1

INVENTORS.
FREDRIC E. FLADER and
DONALD C. ROWE.
BY
ATTORNEYS.

Dec. 31, 1935.　　F. E. FLADER ET AL　　2,025,735
AMPHIBIAN LANDING GEAR
Filed June 15, 1934　　9 Sheets-Sheet 3
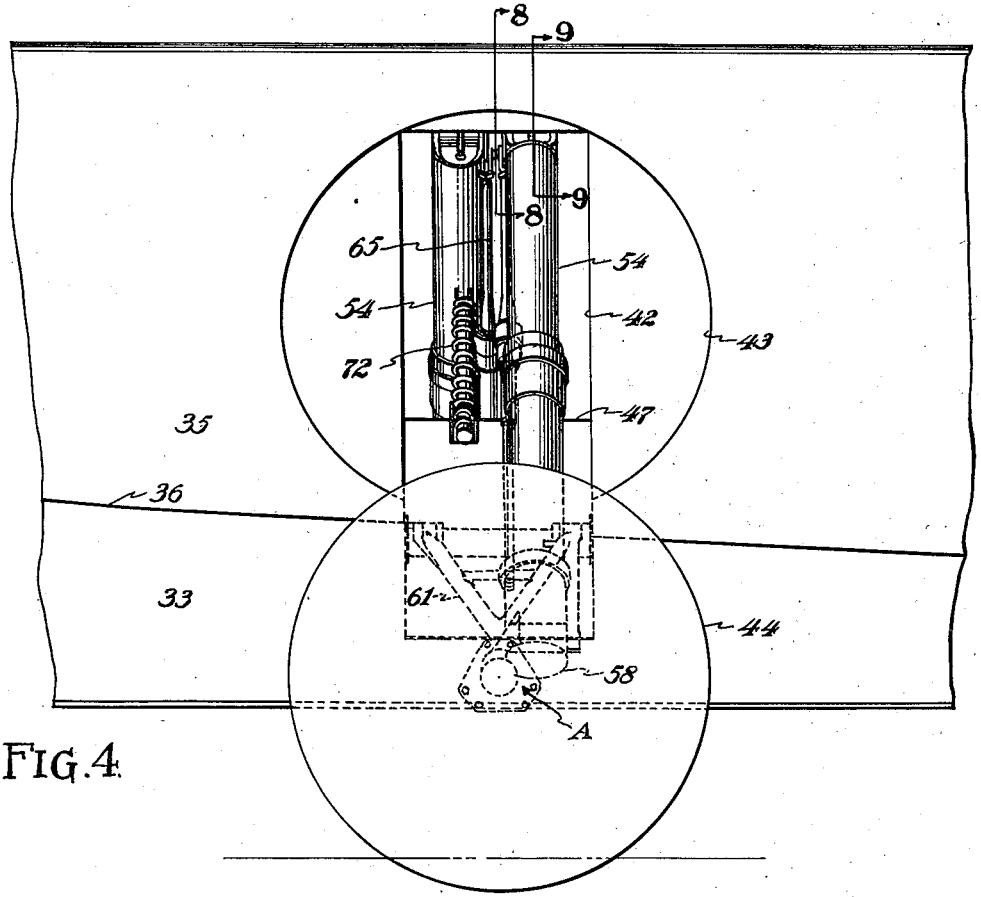
FIG.4.
FIG.5.
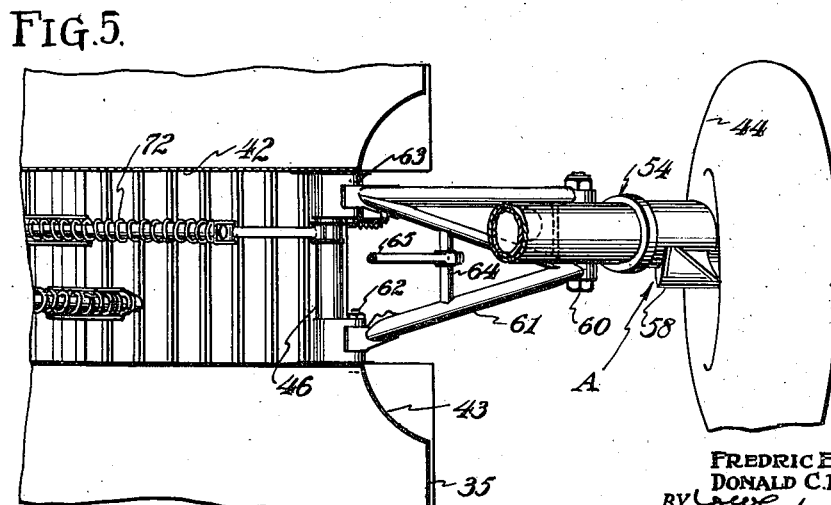
INVENTORS.
FREDRIC E. FLADER, and
DONALD C. ROWE.
BY
ATTORNEYS.

Dec. 31, 1935.   F. E. FLADER ET AL   2,025,735
AMPHIBIAN LANDING GEAR
Filed June 15, 1934   9 Sheets-Sheet 4

INVENTORS.
FREDRIC E. FLADER. and
DONALD C. ROWE.
BY
ATTORNEYS.

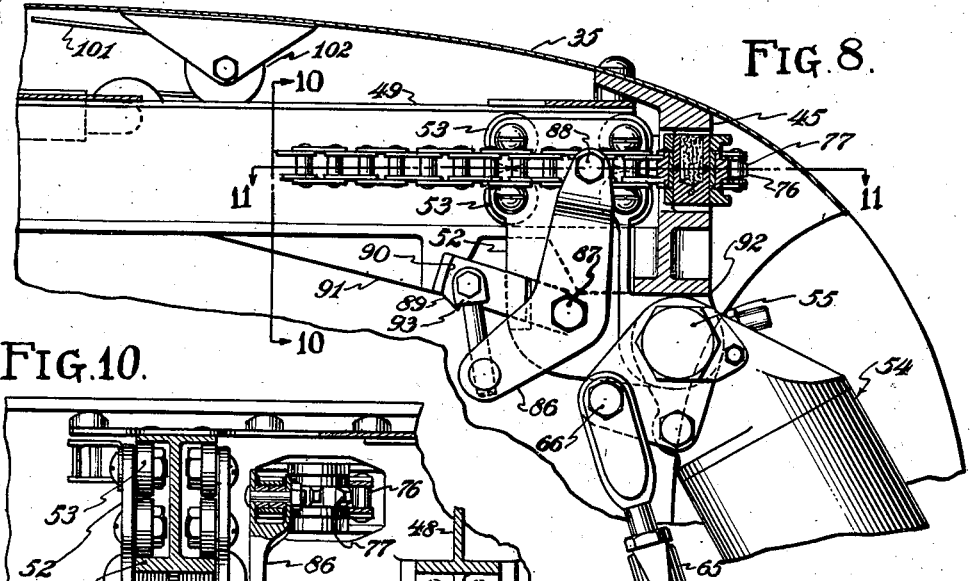

Dec. 31, 1935.    F. E. FLADER ET AL    2,025,735
AMPHIBIAN LANDING GEAR
Filed June 15, 1934    9 Sheets-Sheet 6
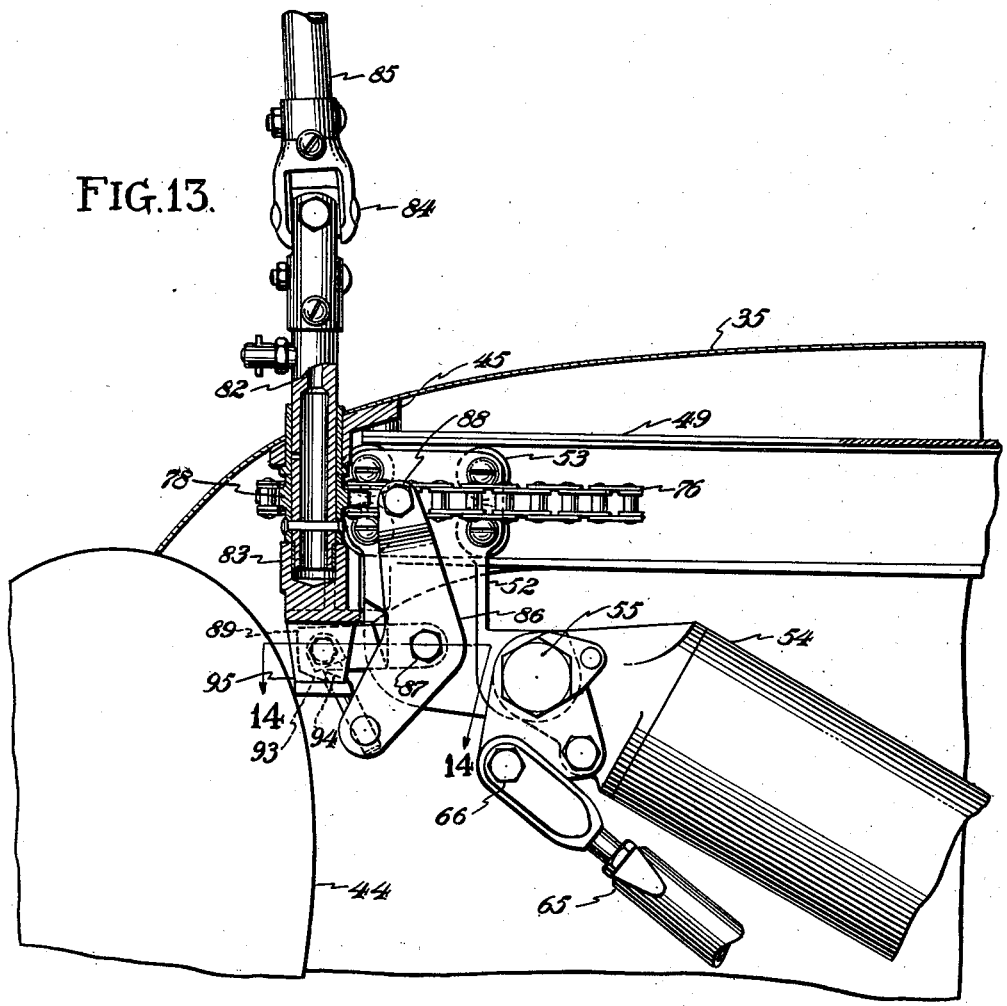
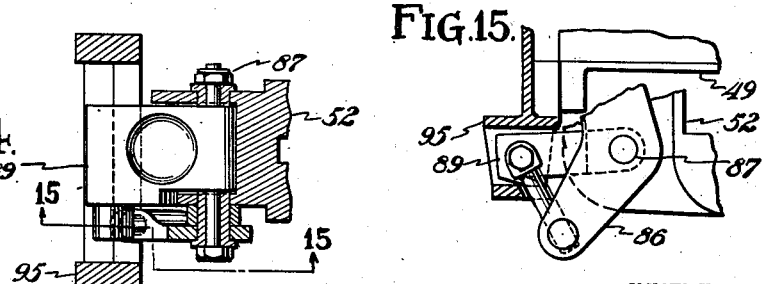
INVENTORS
FREDRIC E. FLADER and
DONALD C. ROWE
BY
ATTORNEYS Dec. 31, 1935.          F. E. FLADER ET AL          2,025,735
                       AMPHIBIAN LANDING GEAR
                        Filed June 15, 1934        9 Sheets-Sheet 7
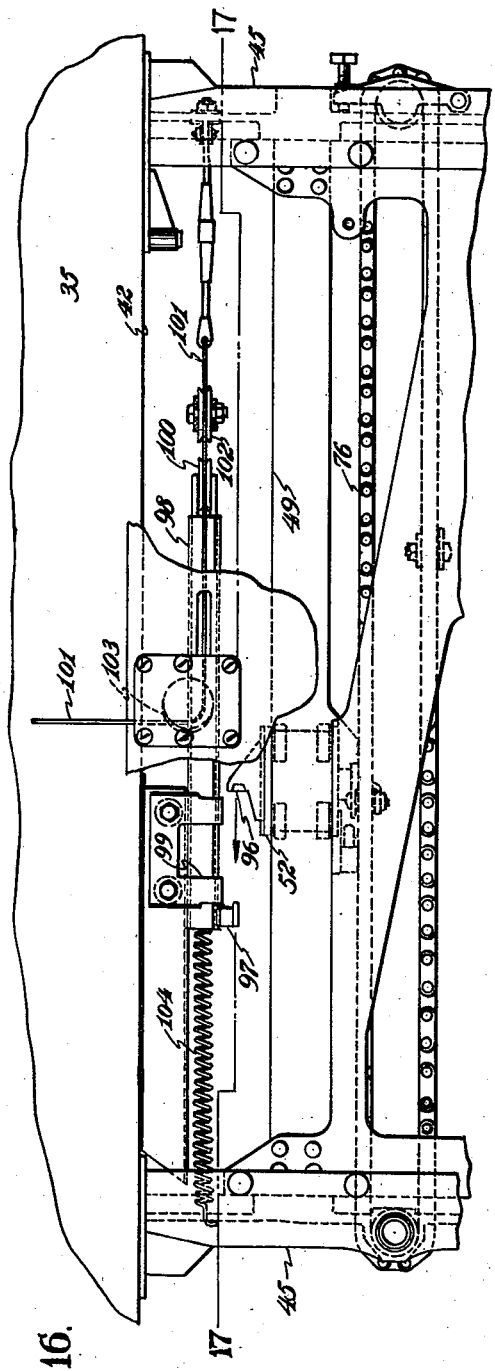
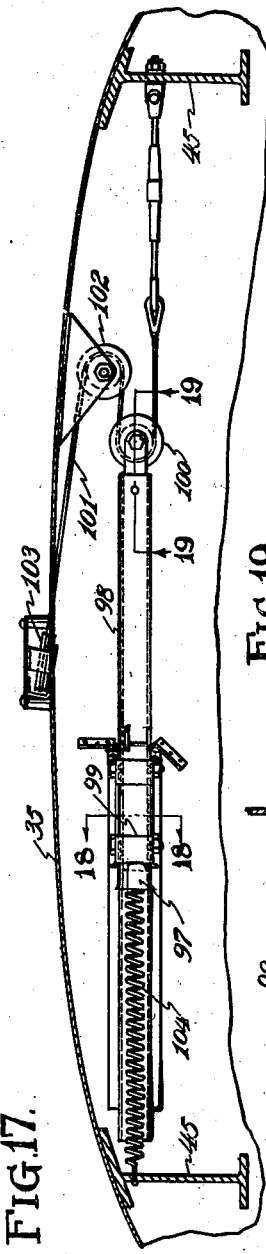
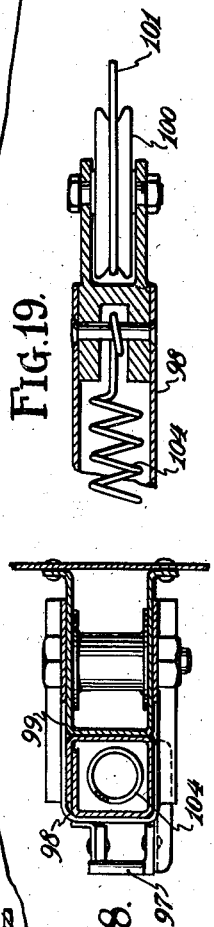
INVENTORS.
FREDRIC E. FLADER, and
DONALD C. ROWE.
BY
ATTORNEYS.

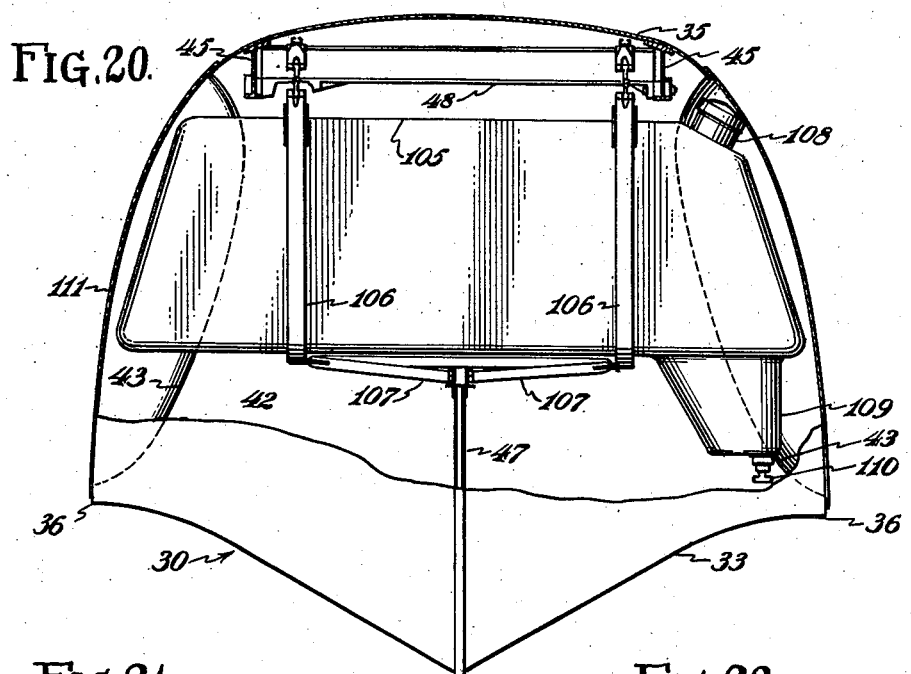
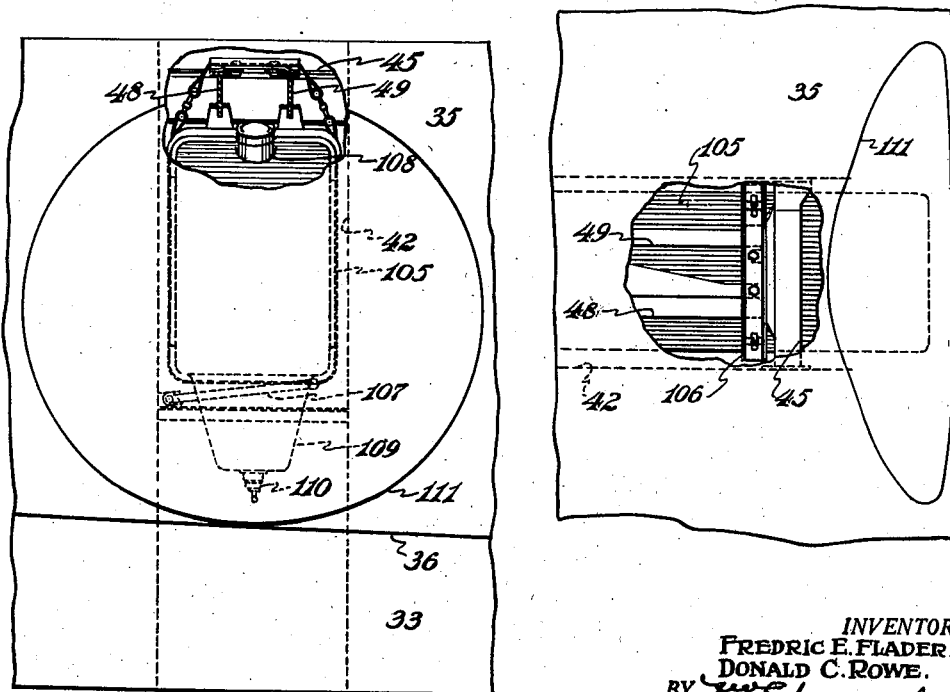

Dec. 31, 1935. F. E. FLADER ET AL 2,025,735
AMPHIBIAN LANDING GEAR
Filed June 15, 1934 9 Sheets-Sheet 9

INVENTORS.
FREDRIC E. FLADER and
DONALD C. ROWE.
BY
ATTORNEYS.

Patented Dec. 31, 1935

2,025,735

UNITED STATES PATENT OFFICE 2,025,735

AMPHIBIAN LANDING GEAR

Fredric E. Flader and Donald C. Rowe, Kenmore, N. Y., assignors to Curtiss Aeroplane & Motor Company, Inc., a corporation of New York Application June 15, 1934, Serial No. 730,699

3 Claims. (Cl. 244—2)

This invention relates to aircraft retractable landing gears, and particularly to a retractable landing gear adapted to be used in conjunction with seaplanes of the type having a single central float.

Objects of the invention are to provide a particularly compact form of retractable landing gear which, when retracted, may be wholly encompassed within the relatively narrow confines of a single aircraft pontoon; to provide a simultaneously retractable main landing gear and tail wheel; to provide a retractable landing gear wherein the wheels are transversely aligned but wherein the landing structures for each wheel are longitudinally spaced; to provide a pair of oppositely extending landing gear structures which, when retracted, may occupy a space with a relatively narrow aircraft pontoon and which, when retracted, overlie one another. Still another object is to provide automatically operable means for locking the landing gear in both extended and retracted positions upon movement of the landing gear to such positions.

A further object is to provide an alternative fuel tank installation for an aircraft pontoon, said tank being organized to lie within the space which might otherwise be occupied by a landing gear.

Still another object is to combine in a novel manner a compressible shock absorber strut in an amphibian landing gear, so that said strut may occupy a relatively small space within the pontoon, when retracted, and occupy a relatively large space when extended to afford a wide tread for the landing wheels.

Additional objects of the invention will become apparent in reading the annexed specification and claims, and in viewing the drawings, in which similar numbers indicate similar parts, and in which:

Fig. 4 is an enlarged side elevation of a portion of the float with the landing gear extended;

Fig. 5 is a section on the line 5—5 of Fig. 3;

Figure 23:
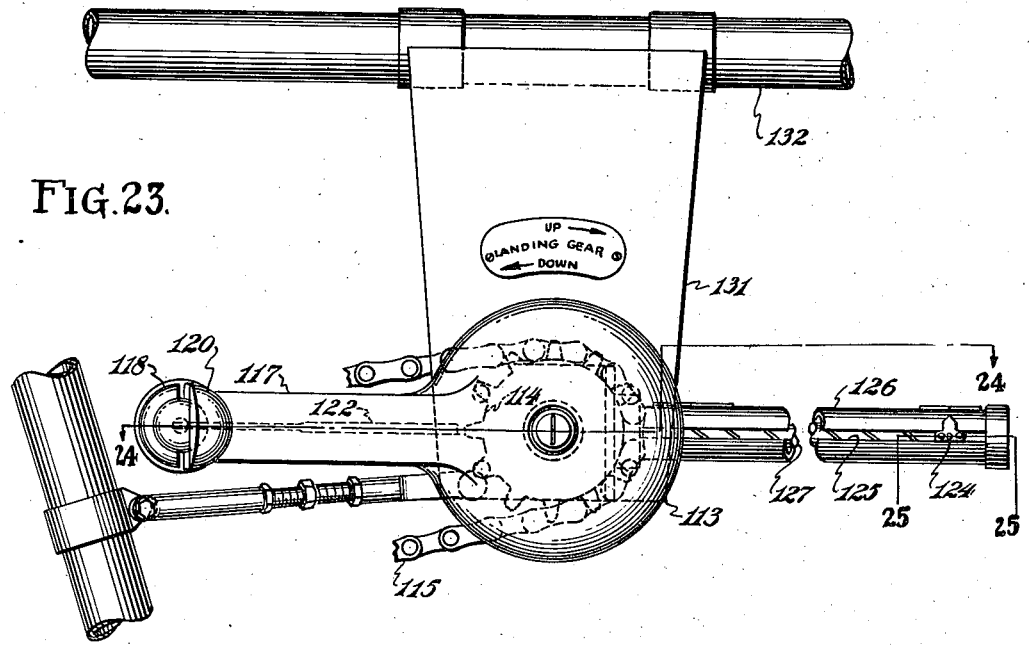
Figure 24:
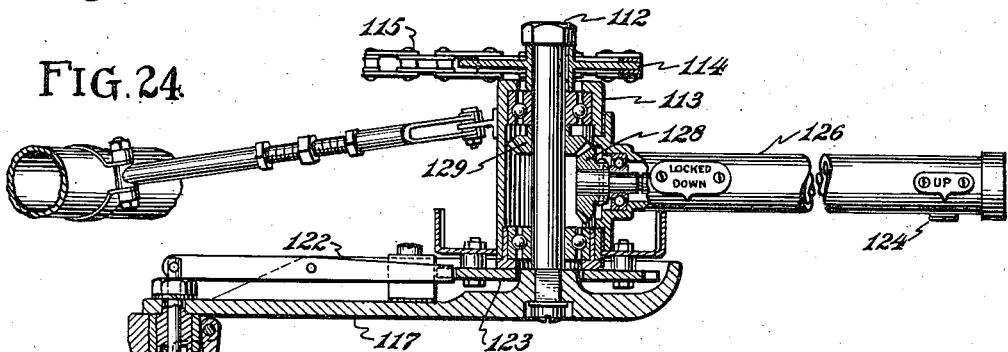
Figure 25:
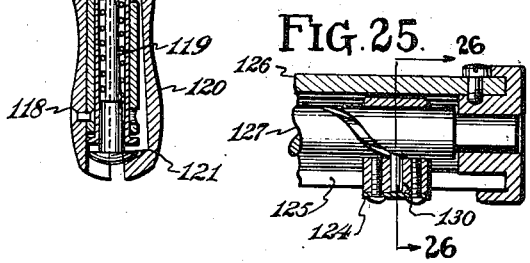
Figure 26:
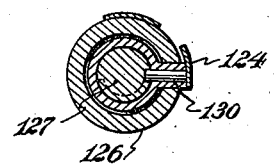

Figs. 8 and 9 are sections on the lines 8—8 and 9—9, respectively, of Fig. 4;

Figs. 10 and 11 are sections on the lines 10—10 and 11—11, respectively, of Fig. 8;

Fig. 12 is a section on the line 12—12 of Fig. 9;

Fig. 13 is an enlarged transverse section of part of the landing gear operating mechanism;

Fig. 14 is a section on the line 14—14 of Fig. 13;

Fig. 15 is a section on the line 15—15 of Fig. 14;

Fig. 16 is a fragmentary plan, broken away, to show a portion of the tail wheel retracting mechanism;

Fig. 17 is a section on the line 17—17 of Fig. 16;

Figs. 18 and 19 are sections on the lines 18—18 and 19—19, respectively, of Fig. 17;

Fig. 20 is a transverse section through the pontoon showing a fuel tank installed in the space which might otherwise be occupied by the landing gear;

Fig. 21 is a fragmentary side elevation, partly broken away, to show the suspension of the tank of Fig. 20;

Fig. 22 is a fragmentary plan, partly broken away, of the aircraft pontoon showing the suspension of the tank shown in Fig. 20;

Fig. 23 is a side elevation of the cockpit operating means for the landing gear;

Figs. 24 and 25 are sections on the lines 24—24 and 25—25, respectively, of Fig. 23; and Fig. 26 is a section on the line 26—26 of Fig. 25.

Figure 1:
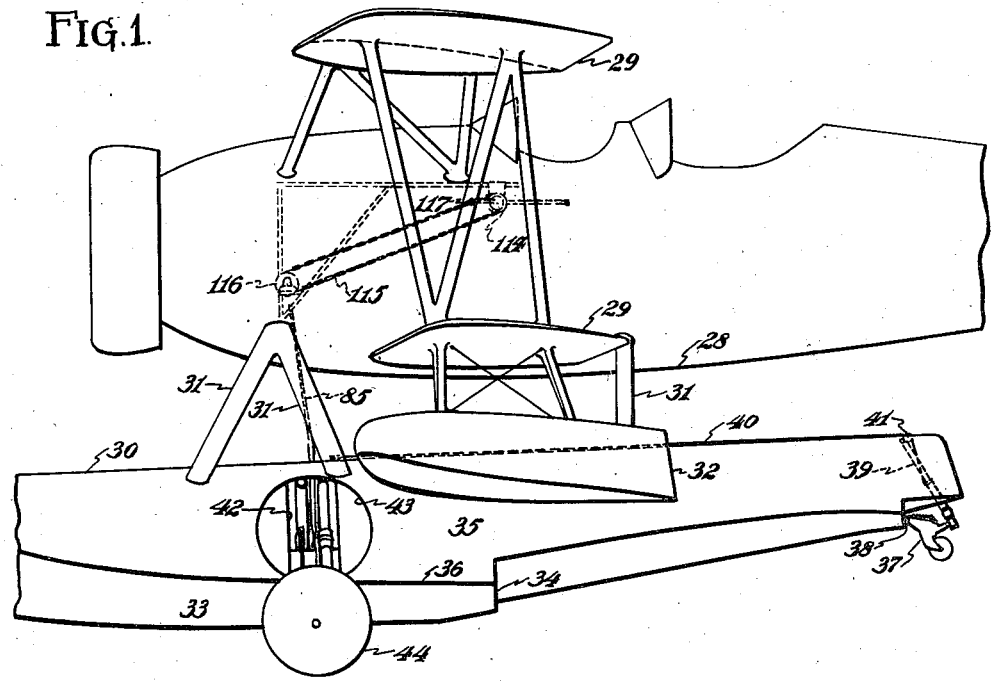
Fig. 1 is a side elevation of a single float seaplane embodying the landing gear of this invention.

In Fig. 1, which shows the general organization of the landing gear as applied to an airplane, the aircraft fuselage 28 is provided with the usual wings 29 and is carried in spaced relation above a single pontoon 30 by means of struts 31. As is usual in the single float type of seaplane, wing tip floats 32 are carried at the outer wing tips to prevent overturning of the craft when it is resting upon the water.

The pontoon 30 is of the usual construction including a V bottom portion 33 having a step 34 located intermediate the length thereof. The pontoon has a curved deck 35 extending upwardly and across the pontoon from the chines 36. At the rearward end of the pontoon, a tail wheel unit 37 is hinged on a transverse axis 38, and is braced for landing contact by a strut element 39. This strut element 39 is capable of being shortened in length to lift the tail wheel unit 37 above the plane of the bottom 33 in order to prevent undue drag of the tail wheel in the water. Retraction of the tail wheel is effected by pulling upon a cable 40 which extends from the lower portion of the strut 39 over a pulley 41, and for wardly to the landing gear mechanism presently to be described. Toward the forward portion of the pontoon, an open transverse passage 42 is formed therethrough, this opening extending substantially from the chines 36 substantially to the upper side of the pontoon covering 35. This passage 42 is substantially rectangular in side elevation, and the outer sides of the pontoon covering 35 are depressed as at 43 to form wheel receiving recesses within which wheels 44 are adapted to nest when retracted to lie substantially flush with the outer surface of the pontoon.

Figure 3:
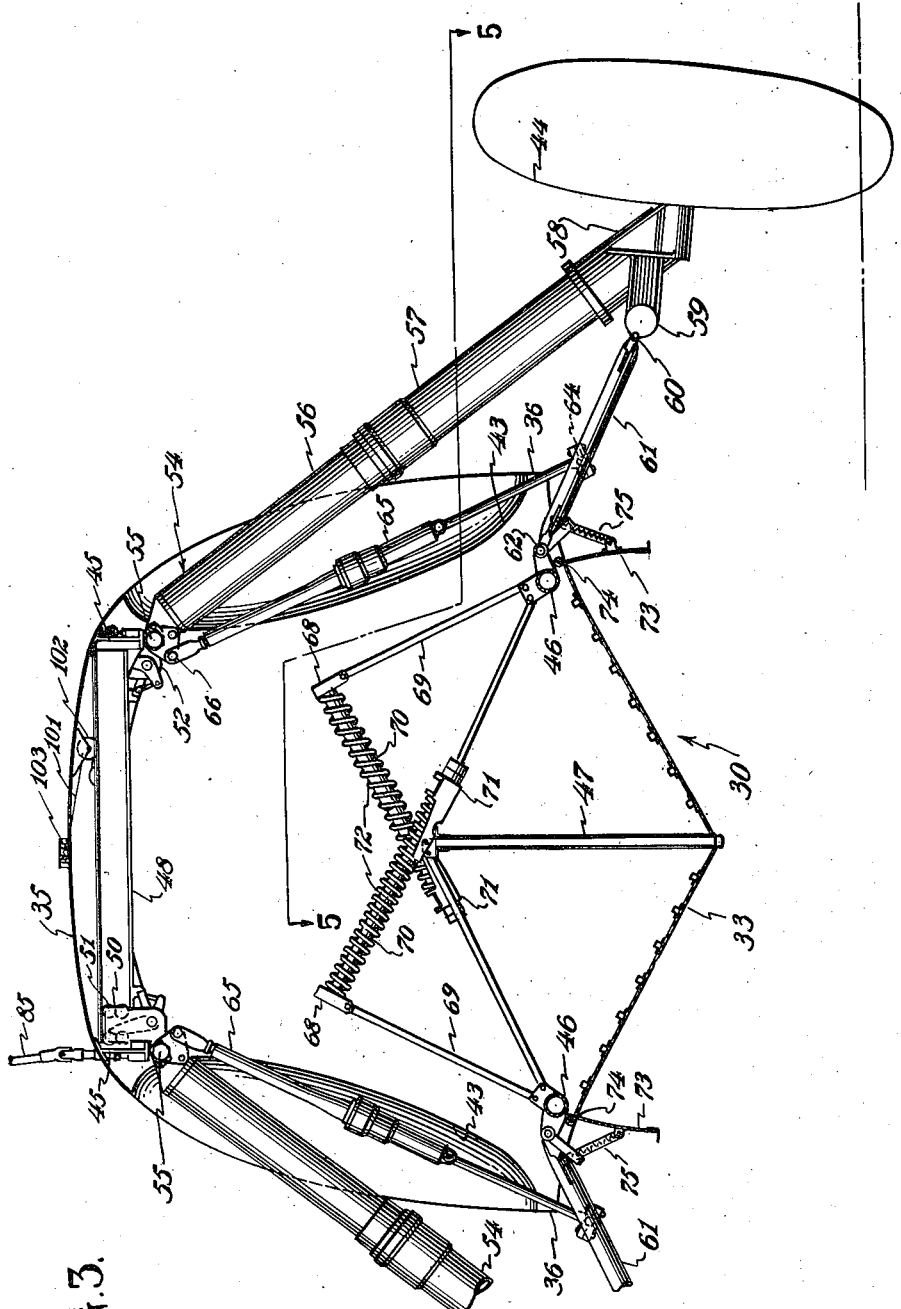
Fig. 3 is a transverse section through the float showing the landing gear in an extended position.
Figure 6:
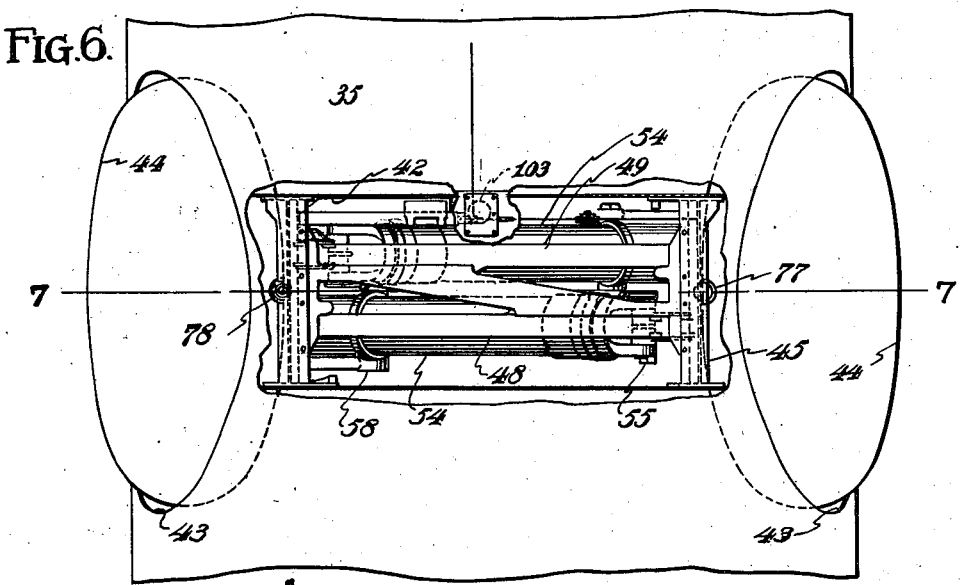
Fig. 6 is a plan, partly broken away, of the aircraft float showing the landing gear retracted.

Now referring to Figs. 3 to 15, the particular mechanism of the landing gear will be described. The pontoon includes transversely spaced upper longérons 45, extending longitudinally of the pontoon and forming part of the main structural bracing thereof. Similarly, longitudinal structural members 46 lie close to the chines 36 of the pontoon and form part of the main structural bracing thereof. The keel 47 likewise extends throughout the length of the pontoon. The several elements 45, 46 and 47 extend through the passage 42, and the several elements of the landing gear are attached to them. As shown, for instance, in Figs. 3 and 6, a pair of tracks 48 and 49 extend transversely across the upper part of the pontoon and are fixed at their ends to the longérons 45, these tracks 48 and 49 being of I-beam cross section and being in spaced parallel relationship. A slide 50 carries a plurality of rollers 51 which engage the track flanges whereby the slide may be translated along the track 48 from one end to the other. Similarly, a slide 52 is provided with rollers 53 to permit the slide to move throughout the length of the track 49. The detailed construction of the landing gear elements on each side of the pontoon is substantially the same, so that a description of one will suffice for the other. It should be borne in mind, of course, that the landing gears are opposite in their relationship.

A compressible landing gear strut 54 is pivoted at 55 to the slide 52, said strut including a plunger element 56 over which a cylinder element 57 may telescope, the lower end of the cylinder 57 carrying an axle fitting 58 upon which the wheel 44 is carried for rotation. The axle fitting 58 is provided with an extension 59 to which is pivoted, at 60, a brace frame 61, this brace frame including spaced tubes pivoted, in longitudinally spaced relation at their inner ends, to the chine members 46 at 62 and 63. Intermediate the length of the frame 61, a cross bar 64 is mounted, this bar serving as a journal for a rod 65 extending upwardly to a pivot 66 fixed to the upper end of the landing gear strut 54. The strut 54 is of the type described in a co-pending application, Serial No. 674,812, filed June 8, 1933, by A. G. Butler, et al. In this type of strut, valve means are provided in the upper end of the strut, as partially shown in Fig. 9, whereby when the landing gear is extended, the strut serves as a shock absorber having limited upward travel. Upon the initiation of retraction of the landing gear, the valve means are operated as by the dog 67, shown in Fig. 9, to permit the cylinder 57 to completely telescope over the plunger 56, whereby, when retracted, the strut 54 may be shortened in length to occupy a substantially reduced space when retracted within the aircraft body. The tension member 65, the equivalent of which is also shown in said co-pending application, serves to positively collapse the strut 54 upon landing gear retraction.

Figure 7:
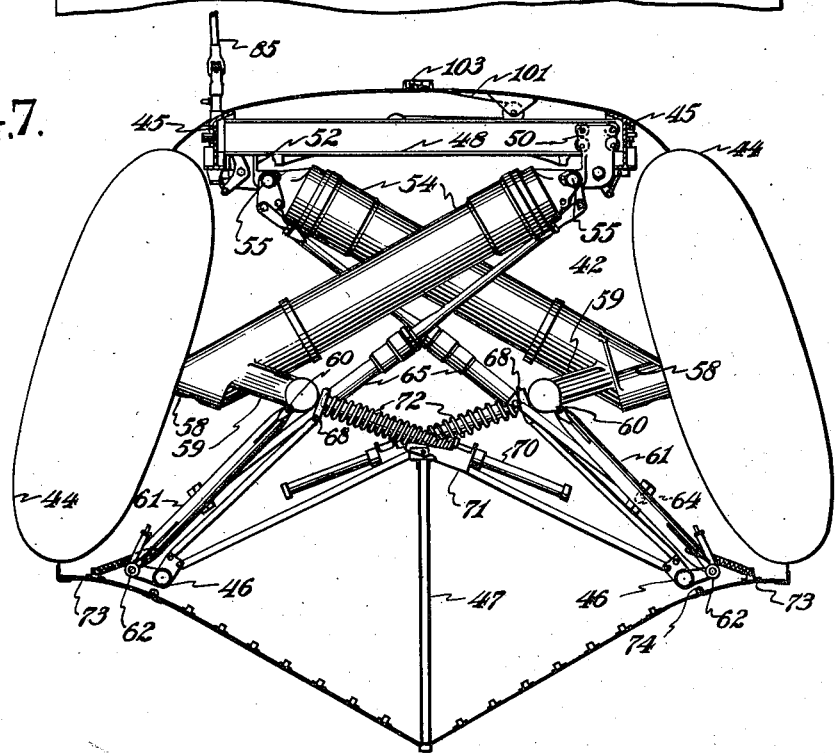
Fig. 7 is a section on the line 7—7 of Fig. 6.

In the present embodiment, the landing gear is retracted by translating the slide 52 from one end of the track 48 to the other, the retracted position being best shown in Fig. 7. It will be seen, by viewing Figs. 3 and 7, when the landing gear is extended the wheel 44 is laterally spaced from the plane of symmetry of the pontoon to provide a very substantial landing gear tread. As the landing gear is retracted, the strut 54 shortens in length by virtue of the action of the tension member 65 so that, when retracted, all of the strut and bracing elements of the landing gear are confined within the passage 42 and the wheel 44 lies within the recess 43, so that its outer surface lies close to the outer surface of the pontoon. It will also be noted that when fully retracted, the landing gear pivots 55, 60 and 62 are almost in alignment. In other words, the pivot 60 would almost be on a dead center when it is considered that the pivot 55 must be moved laterally to extend the landing gear. To ease the considerable effort which would be necessary to initiate extension of the landing gear under the dead center condition, a pad 68 is pivotally supported to the chine member 46 by a rod 69, said pad also having a rod 70 slidably engaging a fitting 71 attached to the keel 47. A compression spring 72 extends from the pad 68 to the fitting 71, tending to urge the pad 68 outwardly. As the landing gear is retracted, the axle fitting extension 59 abuts against the pad 68 and as retraction of the landing gear is continued, the spring 72 is compressed. Thus, when the landing gear is extended from a retracted position, the spring 72 tends to urge the pivot 60 from its dead center position to ease the landing gear extension.

Since the chine members 46 are located slightly inboard from the chines 36, the frames 61 will tend to lie below the chines when the landing gear is extended. To allow for this, the bottom of the pontoon is cut away and a flap 73 is hinged thereto at 74. A link 75 pivotally connects the flap 73 with the frame 61 so that when retracted, the flap 73 is pulled up flush with the balance of the pontoon bottom, permitting continuity of the bottom for water landings and take-offs.

Figure 2:
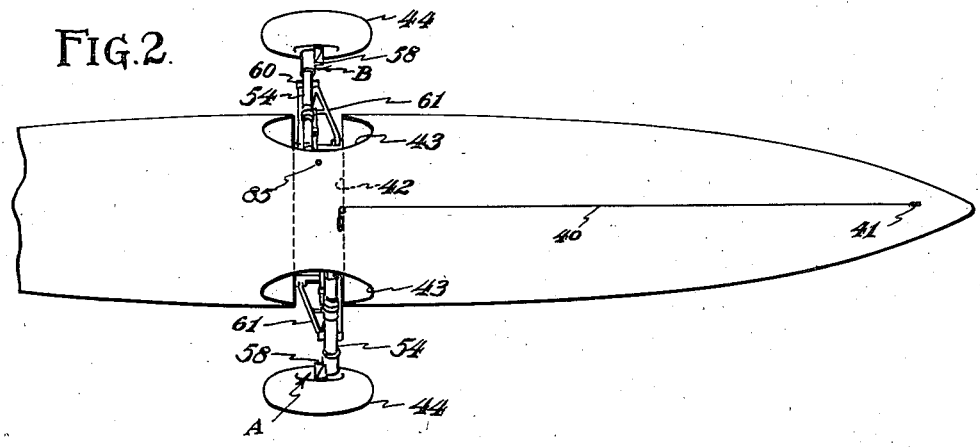
Fig. 2 is a plan of the float of the seaplane showing the landing gear in an extended position.

From the previous description it will be understood that the tracks 48 and 49 are spaced from each other to allow the right and left landing gear assemblies to cross one another as shown in Fig. 7, whereby the landing gear is extremely compact when retracted. The struts 54, when retracted, will lie one behind the other, and the axle fittings 58, since they form the lower end of the struts 54, will be longitudinally spaced from one another. Obviously, it is essential that the wheels 44 themselves be transversely aligned. To accomplish this end, the axle for the left hand wheel 44 is offset from the center line of the left hand strut 54, this offset being accomplished in the left hand axle fitting 58. Since the left hand strut 54 is the rearwardmost strut, the offset will be forward as shown at A in Fig. 2. Correspondingly, the right hand strut 54 is forwardly located, and the right hand wheel axle is rearwardly offset therefrom as at B by the conformation of the right hand axle fitting 58. By the opposite offsets in the right and left hand axle fittings, the wheel axles are transversely aligned in spite of the longitudinal spacing of the right and left landing gear assemblies. The brace frames 61 are correspondingly spaced, the pivot 60 for the left hand landing gear being rearwardly located with respect to the pivot 60 for the right hand landing gear. The right and left frame pivots 62 and 63, however, are transversely aligned, the frames serving to assume the drag stresses imposed upon the landing gear.

The detailed mechanism for operating the slides 51 and 52 is best shown in Figs. 8 to 15. Between the tracks 48 and 49, a chain 76 runs over sprockets 77 and 78 mounted adjacent the longérons 45. The sprocket 77 is mounted on a link 79 pivoted at 80 to the longéron and provided at its outer end with a screw adjustment 81 which serves to tighten the chain. The sprocket 77 is an idler. The sprocket 78 is mounted upon a shaft 82 borne in a fitting 83 mounted on the longéron 45, this shaft extending upwardly through a universal joint 84 to a shaft 85 connected with manual operating mechanism in the aircraft cockpit. It is obvious that the two runs of the chain will move in opposite directions upon rotation of the shaft 85. The slide 50 is therefore connected to one run of the chain and the slide 52 is connected to the other run of the chain by substantially similar means. A bell crank 86 is pivoted at 87 to the slide 52, the upper end being pivotally attached by a bolt 88 to one run of the chain 76. The lower end of the bell crank 86 carries a locking dog 89 movable therewith, this dog being engageable with an abutment 90 formed on the lower face of the track 49. The material forming the abutment is extended on a gradual angle as at 91 to blend into the lower face of the track. The above described mechanism forms the means for effecting translation of the slide by virtue of movement of the chain and also for locking the slide in an extreme position when the chain has been moved to its limit of travel. The functioning of the mechanism is as follows—assuming the side in an intermediate position along the track, movement of the chain to extend the landing gear will move the bell crank 86 which will carry with it the slide 52 by virtue of its connection therewith. During this movement, the locking dog 89 will necessarily bear against the lower surface of the track 49. As extensive movement of the chain is continued, the dog 89 will ride up on the angled portion 91, concurrently moving the slide 52, until said slide has reached the limit of its travel. At this point, the locking dog 89 will just match with the abutment 90, so that a slight further movement of the chain 76 will rock the bell crank 86 about its pivot 87 and cause engagement of the locking dog 89 with the abutment 90. Thereupon, the slide 52 is irreversibly locked in its limiting position, and landing shocks imposed upon the strut 54 will be transmitted to the abutment 90 and also to the longéron 45 by virtue of the contact of the upper end of the strut with said longéron as at 92. Reverse movement of the chain will first pull the locking dog 89 out of engagement with the abutment 90, after which the slide 52 will be moved to retract the landing gear.

Means are also provided, as best shown in Fig. 13, to irreversibly lock the landing gear in a retracted position upon movement of the slide 52 to the opposite end of the track 49. A tooth 93 is formed on the lower portion of the locking dog 89 and, as the bell crank and slide are moved to the extreme retracted position, this tooth engages with a complementary tooth 94 formed in a bracket 95 fixed to the longéron 45. The teeth 93 and 94 will engage when the chain 76 translates the bell crank and slide to the extreme retracted position to hold the landing gear in the retracted position. When extension of the landing gear is initiated, the bell crank 86 will be rocked clockwise about the pivot 87 which will cause upward movement of the dog 89 to effect disengagement of the teeth 93 and 94. Further translation of the chain 76 will then cause movement of the bell crank and slide toward the extended position.

The particular locking means for both the extended and retracted positions are similar for both sides of the landing gear, and are operated concurrently as the runs of the chain 76 are translated in opposite directions by turning of the shaft 85.

Now referring to Figs. 16 to 19, the mechanism for retracting the tail wheel will be described. The rearward slide 52 is provided with an abutment 96 which, as the slide is moved to a retracted position, engages with a complementary abutment 97 mounted on a rod 98 slidable in a guide 99. This rod 98 is provided at one end with a pulley 100 over which a cable 101 passes, one end of the cable being fixed to one of the longérons 45. After running over the pulley 100, the cable runs over a pulley 102 fixedly carried by the pontoon. Thence, the cable passes over a pulley 103 fixed to the pontoon whence it extends rearwardly to join the cable 40 shown in Fig. 1. The rod 98 is urged toward the opposite side of the pontoon from which the cable is anchored, by means of a spring 104 which keeps the cable tight at all times. The mechanism of the tail wheel strut 39 constantly urges the strut to an extended position in a degree sufficient to overcome the tension in the spring 104. As the chain 76 is moved for retraction, the abutment 96 engages the complementary abutment 97, placing further tension on the cable 101 in a degree sufficient to retract the tail wheel.

In Figs. 20 to 22 is shown an arrangement whereby an extra fuel tank may be installed in the pontoons when it may be desired to use the aircraft only as a seaplane without the amphibian features. With the landing gear removed, the passage 42 in the pontoon is left free and clear whereupon a tank 105 may be mounted within the passage. Bands 106 surround the tank and are led over the top faces of the tracks 48 and 49 which, being rigidly mounted and forming a part of the pontoon bracing structure give adequate support for such tank. The lower part of the tank may be braced to the keel 47 by means of members 107. The tank ends may extend nearly flush with the outer covering 35 of the pontoon, thereby extending into the wheel recesses 43. The wheel recesses form a convenient extra space within which a tank filler opening 108 may be placed, and within which a tank sump 109 with a drain cock 110 may also be located. To carry out the smooth surface of the outer pontoon covering, dummy fairings 111 may be provided for the wheel recesses 43, such fairings being attached to the pontoon by screws or other convenient means.

Figs. 23 to 26 show the crank mechanism by which the landing gear may be extended and retracted. This mechanism includes a shaft 112 borne in a housing 113, the shaft having at one end a sprocket 114 over which a chain 115 passes to a sprocket 116 shown in Fig. 1. The sprocket 116 is connected through a conventional bevel gear drive to the landing gear operating shaft 85. The opposite end of the shaft 112 is provided with a crank 117, said crank having a handle 118 through which a pin 119 passes. A portion 120 of the handle is pivoted thereto near the crank and at its outer end is provided with a slanting face 121 engageable with the end of the pin 119. Upon squeezing of the handle elements 118 and 120, the pin 119 is pressed inwardly to disengage a pawl 122 from a fixed notched wheel 123 carried by the housing 113. This construction permits of locking of the handle in any position, but also allows for immediate actuation of the landing gear by gripping of the handle elements 118 and 120 which unlocks the crank 117 for rotation. Indication of the position of extension or retraction of the landing gear is provided by a traveler 124 slidable in a slot 125 formed in a tube 126 extending out from the housing 113. Within the tube 126, a worm shaft 127 is rotatably held, this shaft being driven from the shaft 112 by a pair of coacting bevel gears 128 and 129. The traveler 124 has a pin 130 engageable in the worm slot, the worm pitch being so organized that upon the proper number of turns thereof, and of the shaft 112, the traveler 124 will lie at one end of the slot 125 when the landing gear is fully retracted, and will lie at the other end of the slot when the landing gear is fully extended. The housing 113 is mounted on a bracket 131 which in turn is mounted to one of the structural elements of the aircraft fuselage such as 132.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In aircraft having a retractable landing gear including a translatable element movable to extend and retract said landing gear, a tension member, pulley and cable means connecting said element with said member for moving said member in response to movements of said translatable means, and a retractable tail wheel connected to said member, whereby said tail wheel is retracted in response to movements of said translatable element.

2. In an aircraft pontoon having a transverse through opening from one side to the other thereof and having substantially upright wheel recesses in each side adjacent said opening, a landing gear comprising longitudinally spaced tracks extending laterally within said opening, a slide on each said track, a telescoping resilient strut hinged to each said slide and extendible laterally from said pontoon, said struts being in longitudinally spaced relation whereby when said landing gear is retracted said struts cross within said pontoon, an axle integrally carried at the outer end of each said strut, radius braces each hinged at one end adjacent the pontoon chine and at the other end to one said strut adjacent said axle, said braces being relatively longitudinally offset to accommodate said longitudinally spaced struts, a wheel mounted on each said axle, and means for translating each said slide along its respective track for moving said wheels between an upright position without said pontoon and a substantially upright position within said recesses, said struts and braces, in the retracted position of said wheels, lying wholly within said pontoon.

3. In an aircraft pontoon having a transverse through opening from one side to the other thereof and having substantially circular recesses in the sides thereof, a pair of wheels each movable in a transverse path and at all times lying in a substantially vertical plane, and likewise movable from a position within one said recess to a position below and laterally extended from said pontoon, and means for holding and moving each said wheel comprising a transverse track within said opening, a slide movable therealong, a resilient telescoping shock absorber strut pivoted to said slide, a stub axle integral with the opposite end of said strut on which said wheel is carried for rotation, and a radius brace pivoted at one end to said pontoon adjacent the chine thereof and at its other end to said strut adjacent said stub axle, said strut and brace lying wholly within said pontoon when said wheel lies in a retracted position within said recess.

FREDRIC E. FLADER.
DONALD C. ROWE.